Feb. 12, 1952     W. H. MEIKLEJOHN     2,585,668
MAGNETIC HARDNESS TESTING AND SORTING
Filed April 12, 1946     2 SHEETS—SHEET 1
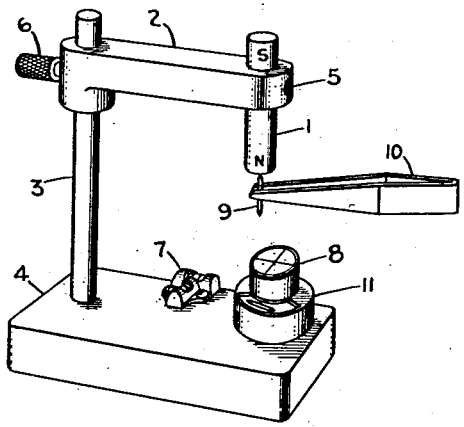
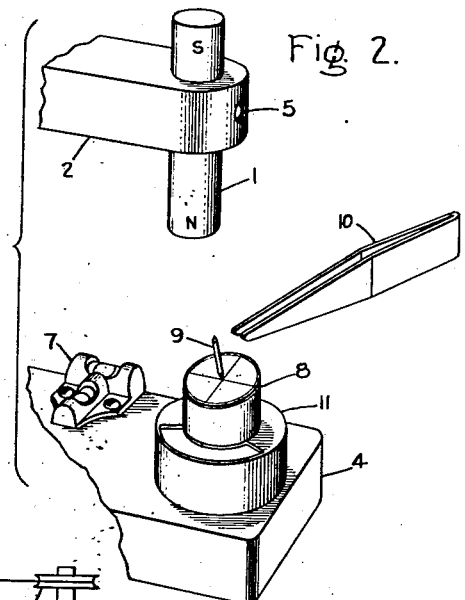
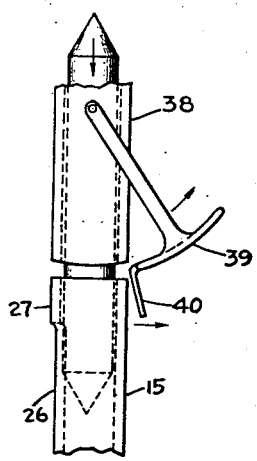
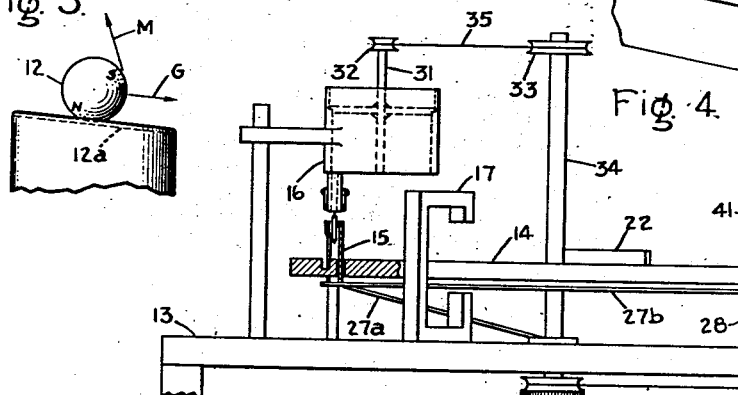
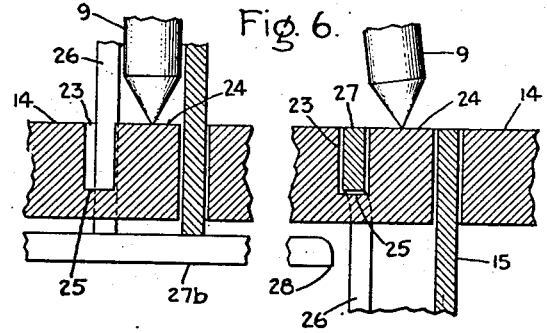
Inventor:
William H. Meiklejohn,
by *Darrell S. Mack*
His Attorney.

Feb. 12, 1952 W. H. MEIKLEJOHN 2,585,668
MAGNETIC HARDNESS TESTING AND SORTING
Filed April 12, 1946 2 SHEETS—SHEET 2
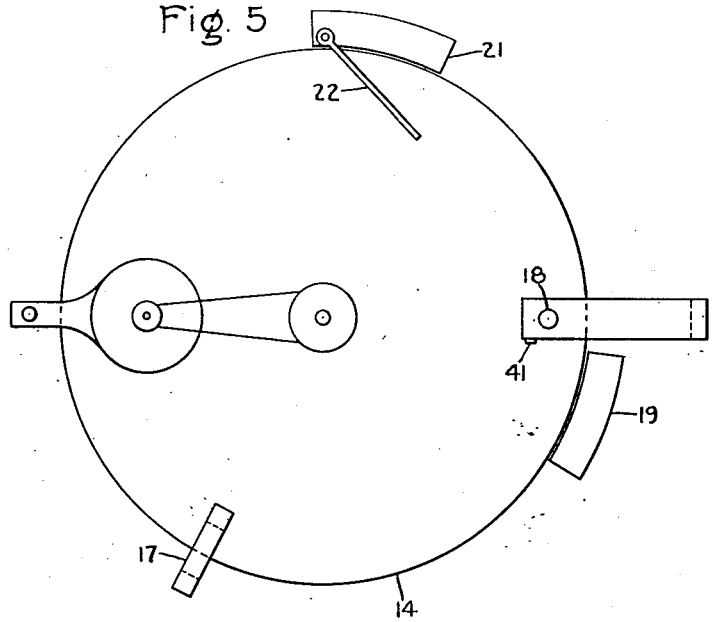
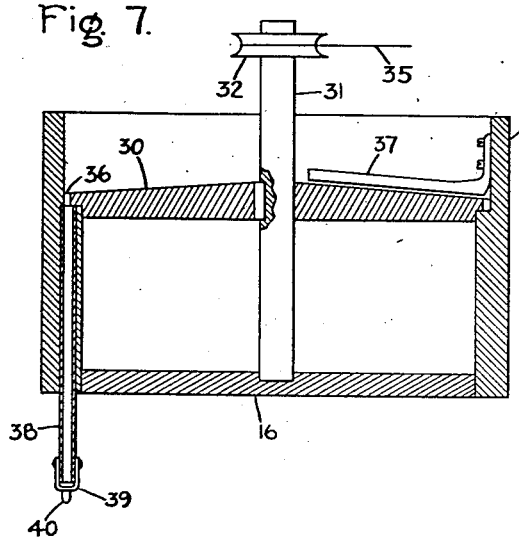
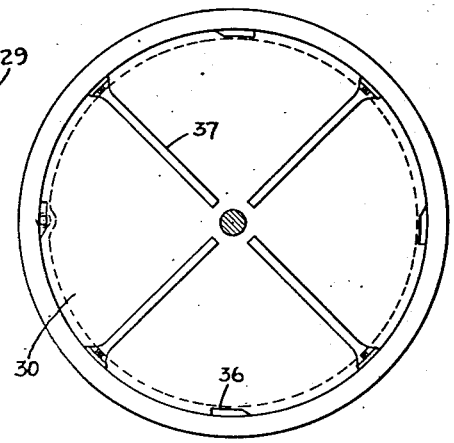
Inventor:
William H. Meiklejohn,
by *Purnell S. Mack*
His Attorney.

Patented Feb. 12, 1952

2,585,668

UNITED STATES PATENT OFFICE 2,585,668

MAGNETIC HARDNESS TESTING AND SORTING

William H. Meiklejohn, Lynnfield Center, Mass., assignor to General Electric Company, a corporation of New York Application April 12, 1946, Serial No. 661,685

3 Claims. (Cl. 209—72)

My invention relates to a method of and apparatus for testing magnetic parts for hardness in order that parts which are below a predetermined degree of hardness may be segregated from harder parts.

In carrying my invention into effect, the parts to be tested are subjected to a predetermined unidirectional magnetizing force. As a result they retain more or less residual magnetism depending upon the degree of hardness, the harder parts retaining more magnetism than the softer parts. The parts are then positioned in a predetermined spaced relation from a magnet of predetermined strength in a condition of mechanical instability under the influence of the magnet and some other opposing force, such as gravity, such that the movement behavior and final stable equilibrium position of the part then will be determined by its hardness and can be classified or sorted accordingly.

The features of my invention which are believed to be novel and patentable will be pointed out in the claims appended hereto. For a better understanding of my invention, reference is made in the following description to the accompanying drawing in which Fig. 1 represents simple apparatus by means of which small steel parts may be sorted into two hardness groups, and shows the magnetizing step in the hardness testing of a steel instrument pivot. Fig. 2 shows a portion of the same apparatus as in Fig. 1 and the manner of completing the test on the steel pivot of Fig. 1. Fig. 3 shows an anvil adapted for testing the hardness of steel balls, and Figs. 4 to 9 relate to a conveyor system for testing and sorting pivots automatically.

Referring now to Fig. 1, the apparatus here shown consists of a permanent magnet 1 supported in a soft iron framework consisting of the horizontal arm 2, vertical arm 3, and base 4. The permanent magnet 1 is supported vertically in the arm 2 and its elevation therein may be adjusted by the set screw 5. The horizontal arm 2 may also be adjusted vertically and rotatively on the vertical standard arm 3 by set screw 6. The base 4 is preferably provided with a two-way level gauge 7 by means of which the base may be made exactly level. Shown on the base is a nonmagnetic block or anvil 8. This block is preferably placed at a definite position on the base but provision may be provided for moving it to other definite positions. The relative position and adjustment of the various parts as shown are typical for the sorting of small steel instrument pivots into two grades of hardness. Instrument pivots which are too soft to have the necessary wearing qualities may thus be sorted out and may be discarded or reheat-treated to increase their hardness before being passed for use. The permanent magnet 1 is well stabilized so that it remains at a predetermined strength indefinitely. It defines the upper extremity of the air gap and produces a flux a considerable portion of which circulates through the generally C-shaped iron framework consisting of parts 2, 3, and 4 and returns to the magnet through the nonmagnet gap between the base 4 and lower end of magnet 1. The flux across this gap is therefore in generally a vertical direction. The magnitude of this flux may be varied by adjusting the vertical position of magnet 1 in arm 2 and otherwise adjusting the shape of the magnetic circuit and the gap therein.

Before using, the apparatus is first calibrated for the particular type and size of parts to be tested. Although leveling the base is not essential, it is generally desirable because then after the apparatus has once been calibrated for a particular job with the base level, such calibration can always be more systematically and quickly re-established, since as will be evident later the level of the base is one factor in such calibration.

Assume, now, that it is desirable to sort steel instrument pivots into two groups; namely, those which are hard enough to make good pivots and those which are too soft. The apparatus may be calibrated as follows: The base is leveled and the parts positioned about as shown. The distance between the bottom end of magnet 1 and the top of block 8 represents about one inch. A demagnetized steel pivot 9 of the size and shape of the pivots to be tested and known to have the desired degree of hardness to just pass as a good pivot is now magnetized by bringing it endwise in contact with the lower end of magnet 1 as pictured in Fig. 1. It being of tempered steel, it will retain residual magnetism when moved away. In other words, it becomes a permanent magnet. The value of residual or permanent magnetism it will retain will depend upon its coercive force which is proportional to hardness; the harder it is the more residual magnetism it will retain. When the pivot 9 is removed from the lower end of magnet 1, it is brought down to rest substantially vertically on the upper end of the center of block 8 such that the end which was touched to magnet 1 points generally toward such magnet and the article 9 is wholly within the air gap. In substantially a maximum flux intercepting position in such transfer of pivot 9, the hand may be used if the pivot is large enough to be handled conveniently. With small parts a pair of nonmagnetic tweezers 10 may be used. In the transfer, the pivot must not be reversed or allowed to come into contact with other magnetic parts or magnetic fields which would influence its residual magnetism. The parts are now adjusted until the standard hardness, standardly magnetized pivot 9 will not fall over on the block 8 when released but will just be prevented from falling over by reason of the attraction between it and the magnet 1 in the field created by such magnet. Most reliable test results are obtained when the block 8 is not directly under the magnet 1 but is positioned about as shown so that the pivot 9, when maintained in the inclined position shown in Fig. 2, is acted upon both by the magnetic force tending to prevent it from falling and the force of gravity tending to cause it to fall and thus move to a substantially reduced flux intercepting position. It is evident that if the apparatus were calibrated with the block 8 directly beneath magnet 9, the magnetic force would tend to hold the pivot exactly vertical and the force of gravity could not act well thereon to tip the pivot, and more care would be required to position the pivot vertically when it is released by the tweezers. By calibrating as first described with the pivot balanced in an inclined position, no special care is necessary in releasing the pivot to see that it is in a vertical position. It can be released in any approximately vertical position where the angle of inclination is not greater than that which will be assumed by a pivot of the required hardness to pass the test.

After the above calibration a pivot of known hardness but not quite hard enough to make an acceptable pivot may be tried, by first magnetizing as before and releasing it while in approximately a vertical position at the center of block 8. Minor readjustment of the calibration may be found desirable to be sure that pivots of corresponding hardness will always tip over. I have found that this form of test where the part to be tested is first magnetized by the standard magnet in a standard way and then subjected to the comparable opposing forces of gravity and magnetism in the calibrated nonmagnetic gap of calibrated geometry and strength is reliable and accurate. The apparatus is now ready to test steel pivots of the size and shape for which calibrated so as to sort the pivots into acceptable and nonacceptable lots as to their hardness. The gauge will differentiate to two points of Rockwell C scale hardness over the entire Rockwell scale. The block 8 preferably has a sloping upper surface so that the unacceptable soft pivots which fall over will roll off into a box 11. Hard pivots which remain standing can be picked off and placed in another box. The upper surface of block 8 may be marked with cross lines or otherwise to indicate the center to the operator. However, the placing of the pivots at the exact center of the block is not very critical for accurate testing as will be evident from the geometry of the flux path through the pivot when in test position.

While the apparatus of Fig. 1 has been described in connection with the testing of small steel pivots, it can be used as a "go" and "no-go" nondestructive hardness gauge for other magnetic parts such as watch shafts, small bolts, washers, disks, balls, etc. which are too small to be tested by other methods. It also permits of spot checking of large sheets or lengths of steel wire through the comparison of random-selected small samples thereof.

Fig. 3 indicates the opposing force relations involved when testing steel balls such as the ball 12. Gravity tends to roll the ball to the right in the direction of arrow G, while the magnetic force arrow M pointing toward magnet 1 tends to prevent such rolling. As the ball rolls to the right the force M increases up to a certain angle of roll of the ball, while the force G remains constant. Balls softer than a given hardness will roll off, while hard balls will not. Blocks for testing balls may have a ball trough in or attached to their upper surface, as indicated by dotted line 12A. This assures a standard direction of roll and is helpful in directing the soft balls to a container.

It will of course be understood that various modifications and ways of using the apparatus to adapt it for different size and shape of parts to be tested may be employed. For example, a considerable range of calibration may be added by using the apparatus as described but with its base inclined at various angles. A separate standard magnet or coil may be used for magnetizing the parts to be tested where, because of the size, shape, or material of such parts, different magnetizing and test magnets are desirable. After parts have been sorted into hard and soft groups as previously described for the pivots, the apparatus may be recalibrated to still further segregate one group into further hardness group classifications. Where the parts to be tested are quite long and slender, a further indication of the degree of hardness of those parts which are hard enough to remain inclined can be obtained by noting or measuring the degree of inclination when in the inclined position, as the softer parts will incline at a greater angle from the vertical than the harder parts.

In Fig. 4 I have represented in outline a general side view of a conveyor system whereby steel parts such as pivots are tested and sorted automatically. Fig. 5 is a plan view of certain of the parts in Fig. 4. The apparatus is supported on a stationary platform 13 and consists of a rotatable turntable 14 having a number of vertically slidable nonmagnetic tubes 15 about its periphery for conveying parts to be tested from a dispenser 16, past a magnetizing magnet 17 and to a test magnet 18 where hard articles which do not fall over when released beneath the test magnet are knocked off the platform into a container 19 by a resilient arm 20. Softer pivots which fall over are carried around and wiped off the turntable into a different container 21 by a wiper at 22. The vertically slidable tubes 15 are slidably mounted through crescent-shaped holes 23 in the turntable as shown in the detail view, Fig. 6. The metal 24 in the interior of such holes is retained by a solid tongue sector 25 between the inner metal parts 24 and body of the turntable at the bottom side of the turntable, while the metal at the top of the turnable is cut away to form complete circles. The tubes contain a slot 26 in one side from their bottom ends to near their tops where the tubes are complete as indicated at 27. The tongues 25 of the turntable are contained in the slots 26 of the tubes such that the metal bridges 25 and 27 prevent the tubes from dropping below the level of the turntable. For about three-fourth distance around the turntable the tubes ride on a track 27b. Opposite the test position the track is omitted so that the tubes ride off the end 28 of the track as they reach the test position; the tubes then drop from the elevated position shown at the left in Fig. 6 to the dropped position shown at the right in Fig. 6, thereby allowing any pivot 9 or other article which has been held upright by the tube to fall over if not held up by magnetic force.

On the back side of the turntable as viewed in Fig. 4 the track 27b begins again but at a slightly lower level than the bottom of the lowered tubes. The track then has an upward slope as shown at 27a in Fig. 4 so that as the tubes are carried around over this circular track, they are again fully raised by the time they reach the dispenser 16. The track is level from this point to the drop-off end 28.

A sectional side view of the dispenser is shown in Fig. 7 and a plan view in Fig. 8. The dispenser has a circular casing 29 containing a turntable 30 keyed to a shaft 31 driven by pulley 32 and belt 35 from a pulley 33 on the conveyor turntable shaft 34. The turntable 30 has a slight downward slope from its center to its periphery. At its periphery there are four equally spaced pockets 36 slightly depressed below the upper surface of this turntable. These pockets are of a size and shape to hold one pivot lying on its side in a tangential direction with respect to the turntable. Above the turntable are four equally spaced stationary wiper arms 37 which assist in conveying pivots toward the pockets as the turntable rotates. At the left edge of the turntable as viewed in Fig. 7, beneath and in line with the pockets 36 as they rotate past, is a tubular chute 38 extending downward into which pivots drop endwise when conveyed to this tube by the pockets 36. The bottom end of this tube is normally closed by a valve or trap-door device 39 pivoted on the lower end of the tube. The tube 38 is positioned so that its lower end is in line with the upper end of the tubes 15 as the tubes rotate past this dispensing point in their raised positions. As a tube 15 approaches the lower end of chute 38, such tube strikes against a projection 40 of the valve and swings it to one side as represented in Fig. 9, allowing any pivot resting on the trap-door device 39 to drop into the tube 15. As soon as the tube 15 passes by, the trap door swings shut in time to retain the next pivot which is dropped into the chute 38. It will of course be understood that the dimensions of the tubes, pockets, etc. which direct, guide, and convey the pivots will be dimensioned and shaped to hold whatever article is being tested and sorted, and principles involved are not limited to testing pivots.

The turntable 14 will ordinarily contain several tubular holders 15, and the turntables 14 and 30 will be driven at such speed ratio as to convey individual pivots from the dispenser 16 past the magnetizing magnet and to test position in a continuous process in which several pivots are being operated upon at different parts of the conveyor and test system simultaneously. It is seen now that pivots or other steel articles to be tested and sorted are fed into the nonmagnetic tubes 15 at the chute 38, are moved past the standard magnetizing magnet 17, and are there subject to a given magnetic field while in a vertical position, and then passed on to a position beneath the test magnet 18 where the supporting tube 15 drops away and leaves the pivot free and subject to the opposed forces of gravity and the test magnet. If the pivot is soft it falls over and is carried around to the wiper 22 and wiped off the turntable into a suitable container.

It is assumed that the pivots are all standard lengths such that when held upright in the tubes 15, their upper ends will pass within a standard small dimension of magnetizing magnet 17 and thus receive a predetermined magnetizing effect. It is to be noted here that if any of the pivots are of appreciably less than the standard length, they will receive less than the standardized magnetizing force and will be discarded with the soft pivots, even though they are made of hard material. Thus the arrangement discards not only soft pivots but all pivots which are appreciably less than the standard length desired.

Operated in synchronizing relation with the conveyor is a spoked member 20 rotated through a pulley or gear 42 from shaft 34. The arms of 20 are resilient and their outer ends swing out over the turntable 14 and path of rotation of the tubular holders 15 adjacent the test magnet, and their outer ends wipe over a stationary part 41 as these arms approach the position where pivots are released and tested. The arms are therefore restrained slightly and are bent and then snap past the part 41, just in time to strike any pivot that may have been released in test position and does not immediately fall over. Thus pivots which are sufficiently hard to be momentarily held from falling over by the magnetic force of the test magnet are hit by the resilient arms and are thus knocked off in a given direction into a suitable container positioned to catch such pivots. The various parts except the base 13 and magnets 17 and 18 should be non magnetic. Such modifications as are obvious to those skilled in the art or are necessary to adapt the apparatus for articles of different size and shape are intended to be included within the scope of my invention.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The method of testing an elongated article for hardness, such article being made of magnetic material which is capable of retaining a substantial amount of residual magnetism comprising subjecting said article to a predetermined unidirectional magnetizing force in the direction of its longitudinal axis, supporting said article as thus magnetized in a predetermined unidirectional magnetic field of lesser magnetizing force in a slightly inclined position on one end such that the force of gravity acting thereon tends to tip the article over and the magnetic forces acting thereon tend to prevent such tipping action and classifying the article in accordance with the movement behavior of the article when thus acted upon by such opposing forces.

2. Apparatus for sorting steel articles according to hardness comprising a movable endless conveyor provided with a plurality of spaced means for supporting articles to be tested, means at one point along said conveyor for feeding articles to be tested to the supporting means on the conveyor, a magnetizing magnet located at another point along said conveyor in the direction of its travel from the feeding point for subjecting the articles to be tested to a predetermined magnetizing force as they pass said magnet, a test magnet located at another point along said conveyor in the direction of its travel from the magnetizing magnet and to which magnetized articles are moved by said conveyor, the article holding means on the conveyor being adjustable from a condition where they will retain articles in a predetermined magnetizing and test position on the conveyor against the force of gravity to a condition where the articles will move from such predetermined test position by the force of gravity, said test magnet being positioned to tend to retain magnetized articles in the test position by magnetic force when such articles are brought within its influence, means adjacent the test magnet for adjusting the article holders from the first to the second mentioned condition whereby articles of a predetermined hardness momentarily will be retained in test position by the test magnet and those of less hardness immediately will move from test position in response to gravity, means dependant upon such test results for segregating the two hardness classes of articles, and means for adjusting the article holders from the second mentioned to first mentioned condition while passing from the test magnet to the article feeding position.

3. Apparatus for testing elongated steel articles for hardness comprising a flat horizontal base plate, a standard extending upwardly from one end of said base plate, an arm adjustably supported at one end from said standard parallel to the base plate and a permanent magnet adjustably supported in a vertical direction in the other end of said arm, said parts being made of magnetic material and forming a U shaped magnetic circuit with an air gap between the lower end of the permanent magnet and the upper side of the base across which flux is produced by the permanent magnet, a non-magnetic support positioned on and rising from the base plate generally beneath the premanent magnet within the air gap, the dimensions and adjustments of said apparatus being such that a vertical air gap length up to one-fourth the total length of the magnetic circuit and a vertical air gap spacing between the permanent magnet and nonmagnetic support up to one-eighth the total length of the magnetic circuit may be obtained whereby elongated steel articles to be tested may be positioned in generally an upright test position on said nonmagnetic support between said support and permanent magnet and below and out of contact with the latter so that the elongated axis will be generally in line with the air gap flux, said support having a relatively flat top so that articles supported thereon in test position will tend to fall over due to gravity, the relation of parts being such in relation to the strength of the magnet and size of the articles to be tested that steel articles of a desired degree of hardness will, after being magnetized by touching one end to the lower pole of the permanent magnet and its opposite end then lowered to rest on the support, be retained in a generally upright position by magnet force while softer articles otherwise similar and similarly magnetized and tested will fall over, the area between said permanent magnet and nonmagnetic support being freely accessible so that elongated articles to be tested may be touched to said magnet and positioned on said nonmagnetic support manually.

WILLIAM H. MEIKLEJOHN.

REFERENCES CITED

The following references are of record in the file of this patent:

UNITED STATES PATENTS

| Number | Name | Date |
| --- | --- | --- |
| 686,889 | Daggett | Nov. 19, 1901 |
| 708,186 | Wetherill | Sept. 2, 1902 |
| 815,113 | Odling et al. | Mar. 13, 1906 |
| 1,103,358 | Hess | July 14, 1914 |
| 1,130,648 | Ullrich | Mar. 2, 1915 |
| 1,366,979 | Ullrich | Feb. 1, 1921 |
| 1,463,713 | Mordey | July 31, 1923 |
| 1,897,731 | Manegold | Feb. 14, 1933 |
| 2,358,782 | Beach | Sept. 26, 1944 |
| 2,427,774 | Fredrickson | Sept. 23, 1947 |

FOREIGN PATENTS

| Number | Country | Date |
| --- | --- | --- |
| 581,964 | Great Britain | Oct. 31, 1946 |

OTHER REFERENCES

Alloys of Iron and Carbon, by F. T. Sisco, page 604, published by McGraw-Hill Book Co., New York 1937.

Publication by R. C. Gibbons in "American Machinist," June 12, 1940, pages 426 and 427.